United States Patent [19]

Chin et al.

[11] Patent Number: 4,523,221
[45] Date of Patent: Jun. 11, 1985

[54] TV RECEIVER CIRCUITRY FOR PERFORMING CHROMA GAIN, AUTO-FLESH CONTROL AND THE MATRIXING OF I AND Q SIGNALS TO (R-Y), (B-Y) AND (G-Y) SIGNALS

[75] Inventors: Danny Chin, Plainsboro; Eric P. Batterman, North Brunswick; Thomas V. Bolger, Merchantville, all of N.J.

[73] Assignee: RCA Corporation, Princeton, N.J.

[21] Appl. No.: 501,908

[22] Filed: Jun. 7, 1983

[51] Int. Cl.³ .............................................. H04N 9/535
[52] U.S. Cl. .................................... 358/21 R; 358/28; 358/30
[58] Field of Search ............... 358/27, 28, 30, 21 R, 358/23

[56] References Cited

U.S. PATENT DOCUMENTS

| | | | |
|---|---|---|---|
| 3,536,827 | 11/1967 | Bell | 358/28 |
| 3,591,707 | 7/1971 | Abbott | 358/23 |
| 3,617,621 | 11/1971 | Cochran | 358/29 |
| 3,649,748 | 5/1972 | Knauer | 358/28 |
| 3,663,744 | 5/1972 | Harwood | 358/28 |
| 3,852,807 | 12/1974 | Caprio et al. | 358/28 |
| 3,873,760 | 4/1975 | Worden | 358/21 |
| 3,996,608 | 12/1976 | Harwood | 358/28 |
| 4,001,879 | 1/1977 | Nagaoka et al. | 358/28 |
| 4,084,178 | 4/1978 | Srivastava et al. | 358/28 |
| 4,272,778 | 6/1981 | Harwood et al. | 358/28 |
| 4,300,154 | 11/1981 | Engel | 358/23 |
| 4,306,247 | 12/1981 | Tomimoto et al. | 358/27 |
| 4,412,181 | 10/1983 | Marguinaud et al. | 329/50 |

OTHER PUBLICATIONS

Harwood et al., "Chroma Circuit Design for the CTC-49", RCA Engineer, vol. 15, No. 5, Feb./Mar. 1971, pp. 15-19.

"Digivision" Development Data, Aug. 1982, ITT Intermetall Semiconductors, Freiburg, Germany.

Primary Examiner—John W. Shepperd
Attorney, Agent, or Firm—E. M. Whitacre; P. J. Rasmussen; E. P. Herrmann

[57] ABSTRACT

A color TV receiver designed to digitally process I and Q color mixture signals incorporates chroma gain control, static tint control and autoflesh in the circuitry for converting the I and Q signals to (R-Y), (B-Y) and (G-Y) for R,G,B matrixing. The magnitude and angle of the vector sum of I and Q are first determined. The angles are then adjusted for static tint control and then applied to a ROM which is programmed to output angles adjusted for fleshtones. Angles from the autoflesh ROM are applied to a summing circuit which algebraically adds to the flesh corrected angle, angle values corresponding to the angular displacement between the I axes and the (R-Y), (B-Y) and (G-Y) axes. The angles produced by the summing circuit are applied to a lookup ROM which produces the cosine values of the applied angles.

The magnitude signal is amplified by coefficients which relate the I and Q signals to (R-Y), (B-Y) and (G-Y) components and which coefficients may be amplified by a chroma gain signal. The amplified magnitude signal is thereafter multiplied by the cosine values which effectively projects the vector sum or chrominance signal onto the respective (R-Y), (B-Y) and (G-Y) axes to generate instantaneous (R-Y), (B-Y) and (G-Y) signal samples.

14 Claims, 6 Drawing Figures

TV RECEIVER CIRCUITRY FOR PERFORMING CHROMA GAIN, AUTO-FLESH CONTROL AND THE MATRIXING OF I AND Q SIGNALS TO (R-Y), (B-Y) AND (G-Y) SIGNALS

BACKGROUND OF THE INVENTION

This invention relates to color signal processing in a TV receiver and more particularly to combined circuitry for digitally performing auto-flesh, tint control, gain control and matrixing I and Q color mixture signals to (R-Y), (B-Y) and (G-Y) color mixture signals.

Currently TV receivers are being developed which will perform signal processing with digital or binary circuitry. Generally, digital counterparts of analog circuits which perform like functions require orders of magnitude more devices. However, the devices required to realize the digital circuits can be integrated on silicon dies (i.e. IC's) to a greater extent than their analog counterparts so that ultimately the number of discrete circuit elements comprising the signal processing circuitry in a TV receiver will be dramatically reduced.

In order to apprecite such a parts reduction using digital circuits it is necessary to perform the requisite processing functions with efficient use of circuitry. To this end circuit elements should desirably incorporate some commonality of functions if the number of digital integrated circuits is to remain low (e.g. less than 6).

SUMMARY OF THE INVENTION

The present invention is an auto-flesh circuit which has been designed to include static tint control, signal gain control and I and Q matrixing. Received I and Q signals are demodulated to generate the magnitude, C, of their vector sum and the angle, $\theta$, between the vector sum and the I axis. The generated angles are augmented first to provide static tint control to adjust overall image colors to viewer preference. Secondly, the angles are augmented by a linear-nonlinear circuit to provide auto-flesh correction. Thirdly, the angles are augmented by three angle values $\Delta\theta_R$, $\Delta\theta_B$ and $\Delta\theta_G$ for projecting the vector sum onto the respective (R-Y), (B-Y) and (G-Y) axes for generating (R-Y), (B-Y) and (G-Y) color difference signals. The augmented angles are sequentially applied as address codes to a ROM table which produces cosine values of the applied address codes. The cosine values corresponding to the augmented angle address codes are then applied to one input of a first multiplier circuit.

The magnitude C is applied to a second multiplier wherein it is modified by a combined gain function which includes a dynamic gain control signal, a saturation control signal and three successively multiplexed coefficients $g_R$, $g_B$ and $g_G$ each sample period. The coefficients $g_i$ relate the transmitted I and Q color mixture signal components of the composite video signal to the (R-Y), (B-Y) and (G-Y) color mixture signals.

The amplified magnitude, C, is applied to the first multiplier which successively produces the three color mixture signals (R-Y), (B-Y) and (G-Y) each sample period according to the equations $$(R-Y) = ACg_R \cos(\Delta\theta_R - \theta) \quad (1)$$
$$(B-Y) = ACg_B \cos(\Delta\theta_B - \theta) \quad (2)$$
$$(G-Y) = ACg_G \cos(\Delta\theta_G - \theta) \quad (3)$$

where "A" is the gain factor corresponding to the product of the saturation control signal and the dynamic gain control signal.

BRIEF DESCRIPTION OF THE DRAWINGS

FIG. 4(a) is a more detailed block diagram of the FIG. 3 apparatus realized with digital signal processing elements;

FIG. 4b is a detailed block diagram of the fleshtone corrector of FIG. 4a; and

DETAILED DESCRIPTION OF THE INVENTION

Many TV designers choose to process color signals using the I and Q color mixture signals rather than the (R-Y) and (B-Y) color mixture signals to extend the bandwidth of chrominance information. At some point it is necessary to convert the I and Q signals to the (R-Y) and (B-Y) color mixture signals to facilitate matrixing to R,G,B color signals for driving the display tube.

Figure 1:
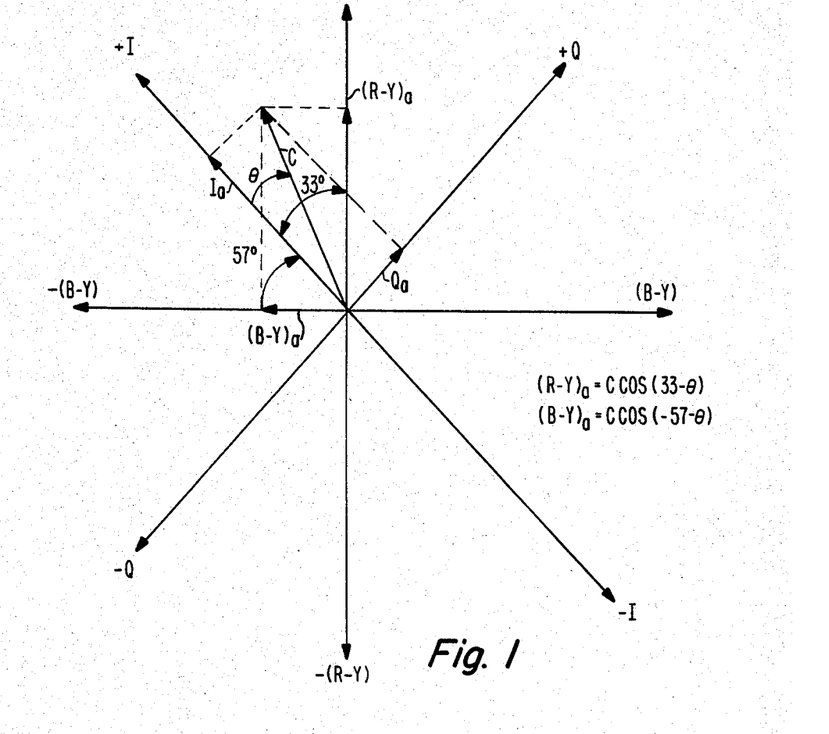
FIG. 1 is a vector diagram showing the relationship of the I, Q, (R-Y), (B-Y) and chrominance vectors for an NTSC composite video signal.

FIG. 1 shows the general relationship of the I and Q quadrature color mixture signals to the NTSC (R-Y) and (B-Y) quadrature color mixture signals and to the instantaneous chrominance vector C. The I axis is 33 degrees from the (R-Y) axis and 57 degrees from the $-(B-Y)$ axis. Knowing the magnitude of the chrominance vector C (e.g. $C = \sqrt{I^2 + Q^2}$) and the angle $\theta$ that vector C is from the I axis (e.g. $\theta = \tan^{-1}(Q/I)$) the instantaneous value of the (R-Y) and (B-Y) signals can be determined. The instantaneous signals $(R-Y)_a$ and $(B-Y)_a$ are the projections of the chrominance vector on the (R-Y) and (B-Y) axes which may be produced from the relationships $$(R-Y)_a = C \cos(33 - \theta) \quad (4)$$

$$(B-Y)_a = -C \cos(57 + \theta) \quad (5)$$

Figure 2:
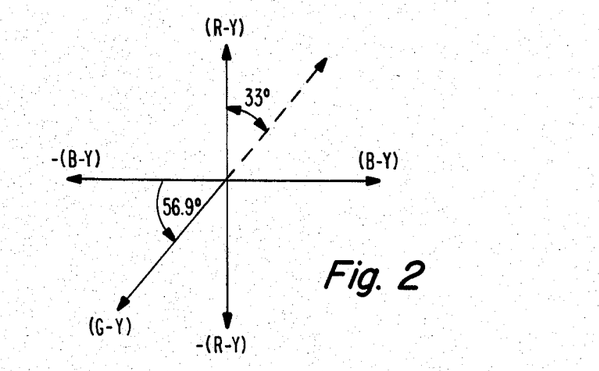
FIG. 2 is a coordinate diagram of the (R-Y), (B-Y) and (G-Y) color mixture signal axes.

Noting the relationship of the (G-Y) axis to the (R-Y) axis in FIG. 2 it will be recognized that the signal $(G-Y)_a$ is given the by relationship $$(G-Y)_a = -C \cos(66 - \theta) \quad (6)$$

The composite video signal, $E_M$, of an NTSC system may be mathmatically described by:

$$E_M = E_Y + (E_Q \sin(wt + 33°) + E_I \cos(wt + 33°)) \quad (7)$$

where $E_Y$, $E_Q$ and $E_I$ are the instantaneous voltages of the Y, Q and I signal components and the term in the outer parentheses represents the chrominance signal. If this same signal is represented in terms of (R-Y) and (B-Y) color mixture signals the composite signal is given by $$E_M = E_Y + (0.493(E_B - E_Y) \sin wt + 0.887(E_R - E_Y) \cos wt) \quad (8)$$

where $E_B$ and $E_R$ are the instantaneous voltages of the Blue and Red color signals and the term enclosed in the outer parentheses is again the chrominance component of the composite signal.

In order to generate non-attenuating (R-Y) and (B-Y) color mixture signals from transmitted composite signal of the form described by equation (7) it is necessary to compensate for the factors 0.493 and 0.877 included in equation (8). This may be done by multiplying the magnitude of the chrominance signal, C, by a vector projection coefficient $g_B$, (e.g. 1/0.493) when the vector is effectively projected onto the (B-Y) axis and by a projection coefficient $g_R$, (e.g. 1/0.877) when it is projected onto the (R-Y) axis. Similarly, the magnitude, C, is multiplied by a projection coefficient $g_G$ when the vector is projected onto the (G-Y) axis.

In typical, commercially produced TV receivers provision is made for adjusting the overall tint of the reproduced image (static tint control) and to automatically force colors generally considered to include flesh tones to appear as "true" flesh tones. Both of these functions require that the chrominance vector be rotated one way or the other from its actual position. This rotation is performed by adding to or subtracting from the actual value of $\theta$.

Figure 3:
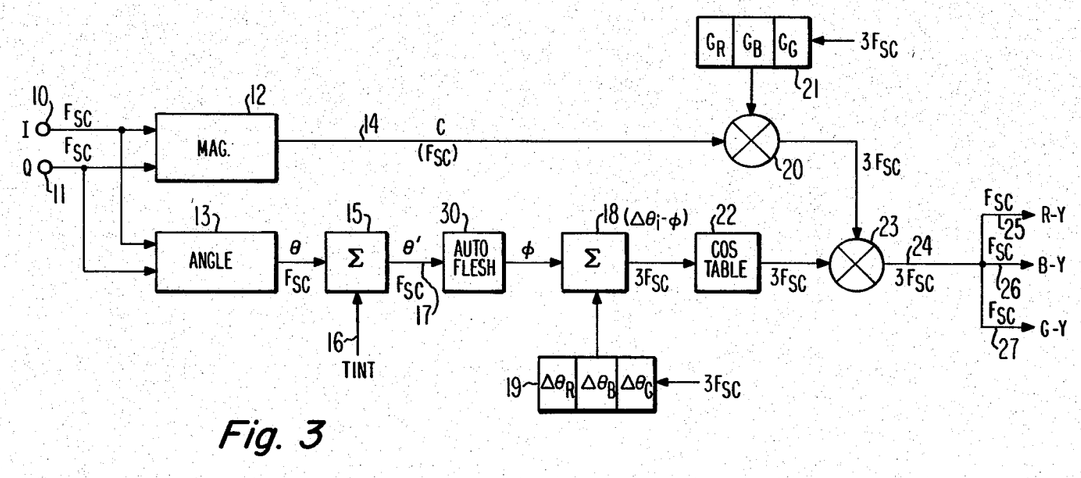
FIG. 3 is a block diagram of color signal processing circuitry embodying the present invention.

FIG. 3 is a simplified circuit diagram of processing circuitry for generating (R-Y), (B-Y) and (G-Y) signals from I and Q signals as well as providing static tint control, auto-flesh, dynamic chrominance signal gain (ACC) and saturation control. The FIG. 3 apparatus is located in the color signal processing path of a TV receiver at a point after which the chrominance signal has been separated from the composite video signal (for example by comb filtering) and after the chrominance subcarrier has been demodulated to recover the I and Q quadrature related components. It will be assumed that the I and Q signals are in sampled data format occurring at the color subcarrier rate of $F_{SC}$.

In the figure the demodulated I and Q signals are respectively applied to terminals 10 and 11 from which they are routed to a magnitude determining circuit 12 and an angle determining circuit 13. Circuit 12 produces signal samples at the $F_{SC}$ rate which corresponds to the instantaneous magnitude C of the vector sum of the instantaneous I and Q signals and which is equal to the magnitude of the chrominance vector. Circuit 13 generates signal samples at the $F_{SC}$ rate which represent the angle, $\theta$, between the vector sum of signals I and Q and the I axis, i.e., $\theta$ equals the arctangent (Q/I). The signal representing the angle $\theta$, hereinafter the signal $\theta$, is applied to a summing circuit 15 wherein a constant angle value is added to effect a rotation of the chrominance vector to adjust overall scene tint. The amount by which signal $\theta$ is augmented, i.e., incremented or decremented, is determined by the viewer applying incremental values to circuit 15 via connection 16 while he is viewing the reproduced image on the display tube. In effect the viewer rotates the chrominance vector until the displayed color satisfies his color preference. Once the proper incremental value is established it is thereafter continuously applied to the angle $\theta$, producing the augmented angle $\theta'$. Note static tint control is performed, in principle, to realign the phasing of the system to its design parameters and has the effect of rotating the I and Q axis relative to the received chrominance signal.

Figure 5:
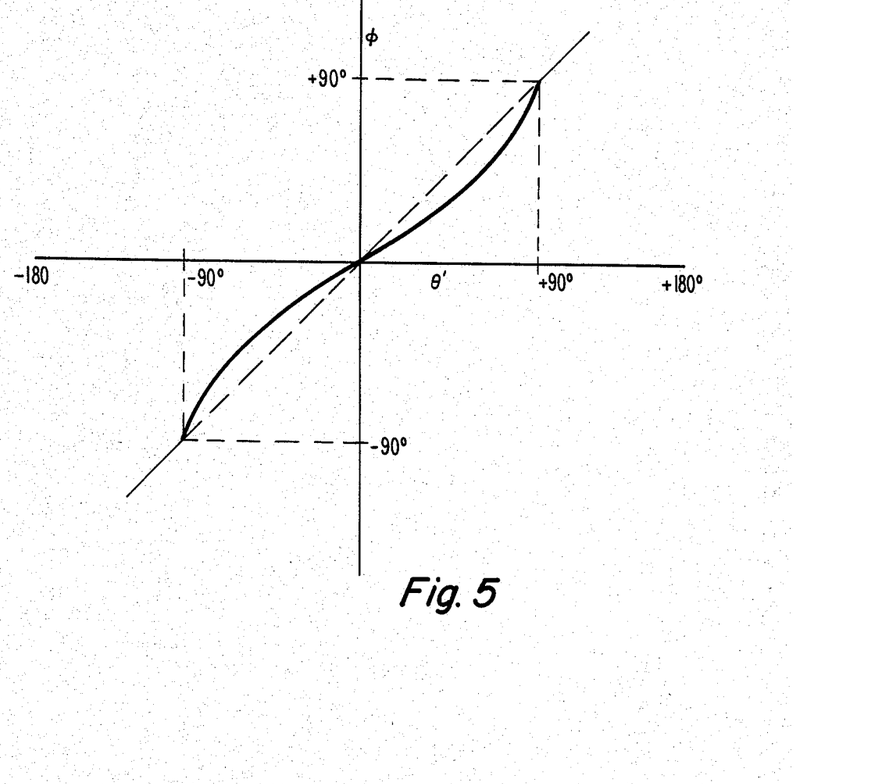
FIG. 5 is a graphic representation of the auto-flesh transfer function.

The angle signal, $\theta'$, from element 16, is applied to element 30 wherein the angle is nonlinearly altered to produce fleshtone correction. Element 30 may be a ROM programmed to produce angles $\theta$ responsive to the input angles $\theta'$. The angles $\Phi$ are equal to the angle $\theta'$ when the chrominance signal does not represent the range of colors considered to be fleshtones. When the chrominance signal does represent colors in the fleshtone range element 30 produces angles $\Phi$ which are a nonlinear function of input angles $\theta'$. For example angle $\Phi$ may equal ($\theta'$-K sin $2\theta'$) in the fleshtone range. This function is illustrated in FIG. 5. The FIG. 5 function will perform flesh correction for angles $\theta'$ which are ±90 degrees from the I axis and no correction outside this range. Auto-flesh correction is accomplished by virtue of element 30 rotating the chrominance vector toward the I axis when angle $\theta'$ is in the range of angles associated with flesh colors. The nearer the chrominance vector is to the I axis the less the required correction; and from FIG. 5 it is seen that the correction tends toward zero i.e., when $\theta'$ is near zero. The farther the chrominance vector is from the I axis while in the flesh color range, the less the required correction to preclude the reproduced color appearing artificial. In FIG. 5 the limits of the fleshtone range are presumed at $\theta' = \pm 90$ degrees and it can be seen that the non-linear correction again tends toward zero near these limits.

The FIG. 5 function in the fleshtone range i.e. $\Phi = \theta' - K \sin 2\theta'$, provides a maximum correction of K degrees of rotation at midrange. When the instantaneous chrominance vector is actually ±45 degrees from the I axis, the angle $\Phi$ produced by element 30 is ($\theta'$-K) degrees. The value K is predetermined by the designer and will generally fall in the range of 14-26 degrees. The function $\Phi = \theta' - K \sin 2\theta'$ produces pleasing fleshtone correction. However, it should be appreciated that other functions $\Phi = f(\theta')$ may be substituted therefore according to the designers preferences.

The augmented signal $\Phi$ on connection 17 is applied to adder circuit 18 wherein it is further augmented by the angular values $\Delta\theta_R$, $\Delta\theta_B$ and $\Delta\theta_G$ needed to project the chrominance vector onto the (R-Y), (B-Y) and (G-Y) axis. The values $\Delta\theta_R$, $\Delta\theta_B$ and $\Delta\theta_G$ available from a storage element 19 are multiplexed at a three times $F_{SC}$ rate into adder 18 which produces three successive signal samples ($\Delta\theta_R - \Phi$), $\Delta\theta_B - \Phi$) and $\Delta\theta_G - \Phi$).

The signals from circuit 18 are applied as address codes to a ROM 22 which produces samples corresponding to the cosines of the applied address codes. The cosine values are thereafter applied to one input port of a multiplier 23.

The magnitude signal C generated by element 12 is applied to one input port of a second multiplier circuit 20 wherein it is multiplied by gain factors $G_R$, $G_B$ and $G_G$. Each of the gain factors $G_i$ may be a composite factor composed of the vector projection coefficient $g_i$, a dynamic chroma gain factor, ACC, and a chroma saturation factor, SAT, (i.e. $G_i = g_i \cdot A_{cc} \cdot SAT$). The factor $G_i$ may be periodically updated at the line or field rate, by for example a microprocessor, and stored in a buffer 21. The factors are thereafter multiplexed to the multiplier 20 at the three times $F_{SC}$ rate to produce successive samples ($C \times C_R$), ($C \times G_B$) and ($C \times G_G$) which coincide in time with the production of the cosine values corresponding to the angles ($\Delta\theta_i - \Phi$) respectively. The samples $C \times G_i$ are applied to a second input port of multiplier 23 which produces the samples $$(R - Y)_a = G_R C \cos(\Delta\theta_R - \phi) \quad (9)$$
$$(B - Y)_a = G_B C \cos(\Delta\theta_G - \phi) \quad (10)$$
$$(G - Y)_a = G_G C \cos(\Delta\theta_G - \phi) \quad (11)$$

that are demultiplexed at the $F_{SC}$ rate onto output lines 25, 26 and 27 respectively.

The (R-Y), (B-Y), (G-Y) signals were formed by projecting the chrominance vector onto the respective axes using cosine values. The projections may be performed by using alternate trigonometric ratios such as the sines of the appropriate angles. Depending upon the trigonometric functions used, differing values $\Delta\theta_R$, $\Delta\theta_B$ and $\Delta\theta_G$ may be required as well as the sense of the values included in the algebraic sums, and circuit elements 18 and 19 must be arranged accordingly. In general terms the algebraic sums would be represented ($\Delta\theta_i \pm \Phi$). For example if the projections were produced using sine ratios, the angle $\Delta\theta_R$ (from FIG. 1) is 57° and the corresponding algebraic sum is ($\Delta\theta_R + \Phi$).

It will be appreciated by those skilled in the art of TV signal processing, that the (R-Y), and (B-Y) signals may not lie on orthogonal axis in particular receivers. Thus angles $\Delta\theta_i$ different from those derived from the standard NTSC color axis relations shown in FIG. 1 will be employed.

Figures 4A, 4B:
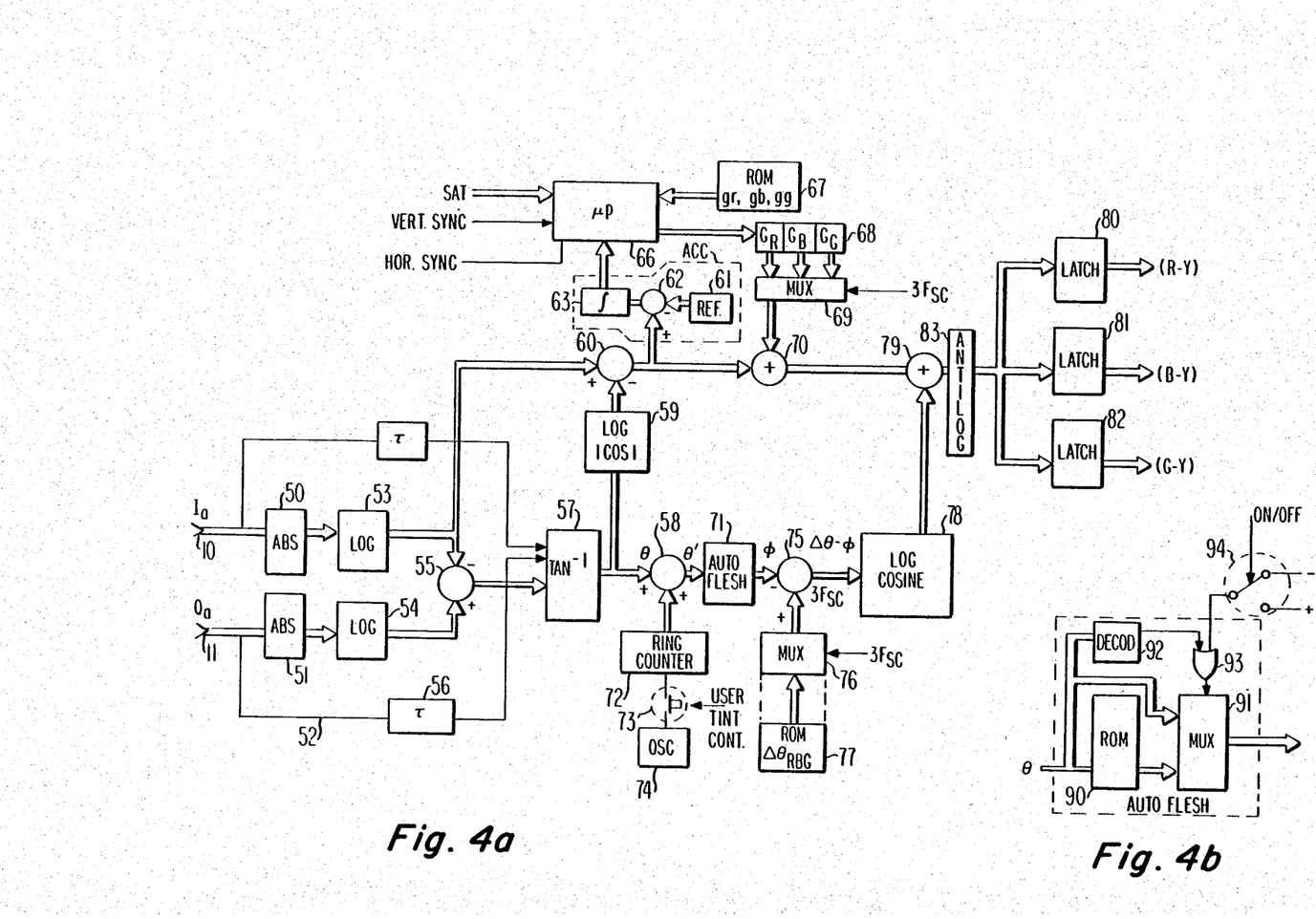

FIG. 4 is an illustrative example of how the circuits of FIG. 3 may be realized using conventional circuit elements. In FIG. 4, the signals being processed are assumed to be in digital format such as pulse code modulated, PCM, binary format (either two's complemented signals or binary signals plus a sign bit). Depending on the signal sample rate and the processing speed of the devices, compensating delays may be required in certain of the signal paths, but one skilled in the art of circuit design would know where such delays would be necessary in his particular system.

In FIG. 4 the I and Q PCM signals are applied to terminals 10 and 11. These signals are respectively applied to absolute value circuits 50 and 51 which pass the magnitudes of the I and Q signals. The magnitudes of I and Q are applied as address codes to ROM's 53 and 54 which are programmed to produce the logarithms of the address codes applied to their respective address input ports. The signal corresponding to the log $|I|$ is subtracted from the signal corresponding to the log $|Q|$ in subtractor 55 which produces output signal codes corresponding to log ($|Q|/|I|$). These signal codes are applied along with the sign bits of signals I and Q as input address codes to ROM 57 (the I and Q sign bits being the most significant bit of the composite address code). ROM 57 is programmed to produce output codes corresponding to the arctangent (Q/I), i.e., angles $\theta$. Since the codes produced by subtractor 55 were generated from the magnitudes $|I|$ and $|Q|$, they only represent the range of angles from zero to 90 degrees. The I and Q sign bits added to the address codes, to ROM 57, provide the information needed to expand the angle information from zero to 360 degrees or from zero to ±180 degrees.

Assume that the N least significant bits of the ROM 57 address input are coupled to subtractor circuit 55, the N+1$^{st}$ bit is coupled to the Ia signal bit and the N+2$^{nd}$ bit is coupled to the Qa sign bit. Assume also that the sign bits are 0's for positive I or Q values and 1's for negative I or Q values. ROM 57 is programmed to output the arctangent of the antilog of the N least significant bits of the applied address code for the N+1$^{st}$ and N+2$^{nd}$ address bits both equal to "0". For the N+1$^{st}$ and N+2$^{nd}$ address bits being respectively 01, 11 and 10, corresponding to the three quadrants occurring clockwise starting from the lower righthand quadrant, ROM 57 is programmed to output signals corresponding to 180° minus; 180° plus; and 360° minus the arctangent of the antilog of the N least significant bits of the address code. In this manner ROM 57 produces angles over the range of 0–360 degrees.

The angle codes produced by ROM 57 are applied to adder 58 wherein static tint control is performed. Static tint control signals may be generated by the output of a ring counter 72, for example, which is selectively connected to oscillator 74 by a viewer controlled switch 73. Output values from counter 72 are applied to a second input port of adder circuit 58. The output codes from ring counter 72 are arranged to cycle through a series of consecutive increasing positive values and a series of consecutive negative values to respectively add to or subtract from the values of $\theta$ and thereby to rotate the chrominance vector in either direction.

PCM codes corresponding to angle $\theta'$ from ADDER 58 are applied to circuit 71 which produces flesh corrected PCM codes corresponding to angles $\Phi$ as described with reference to FIGS. 3 and 5. (Note in some applications the auto-flesh function may be programmed directly into the arctangent table incorporated in ROM 57.)

FIG. 4b illustrates a more detailed auto-flesh circuit 71' which has provisions for inactivation and which requries less memory than a full range of 0° to 360° angles. In element 71' the ROM 90 contains only enough memory angles, $\Phi$, for the number of input angles which occur in the fleshtone range. For all other angles for which $\Phi = \theta$ the input angles $\theta$ are routed around the ROM 90 and applied to an input port of multiplexer 91. The output of ROM 90 is applied to a second input port of multiplexer 91. Multiplexer 91, responsive to a logic high signal from OR gate 93 routes the angles $\theta$ around ROM 90 and directly to its output port, and applies angles $\Phi$ from ROM 90 when the OR gate output is low.

OR gate 93 produces a high output level responsive to the on/off switch 94 being in the OFF position or when the DECODER 92 output connection is high. DECODER 92 is arranged to receive the angle $\theta$ codewords and to output a high level for angles $\theta$ outside the fleshtone range. Signals from ROM 90 are applied to the circuit output only when the angles $\theta$ are in the fleshtone range and therefor ROM 90 need only contain angles $\Phi$ for angles $\theta$ in this range.

PCM codes $\Phi$ from element 71 are applied to subtractor 75 to which signal codes corresponding to the (R-Y), (B-Y) and (G-Y) matrixing angles $\Delta\theta_R$, $\Delta\theta_B$ and $\Delta\theta_G$ are applied. The $\Phi$ codes are applied to subtractor circuit 75 at an $F_{SC}$ sample rate. The three matrixing angle codes from storage element 77 (e.g., a ROM) are each multiplexed into the subtractor circuit 75 for each $\Phi$ codeword, sequentially generating the three difference angles $(\Delta\theta_R - \Phi)$, $(\Delta\theta_B - \theta)$ and $\Delta\theta_G - \Phi)$. This may be performed by clocking the ROM, at a $3F_{SC}$ rate, resulting in the difference angles occurring at a $3F_{SC}$ rate. The difference angles $(\Delta\theta_i - \Phi)$ are applied to element 78 which may be a ROM programmed to generate the logarithms of the cosines of the angles applied as address codes thereto, which logarithms are applied to ADDER circuit 79. The log cosines $(\Delta\theta_i - \Phi)$ are summed therein with the log $(G_iC)$, the chrominance magnitude modified by the gain coefficients, to produce signal code words corresponding to log ($G_i C \cos (\Delta\theta_i - \Phi)$). These signal codewords are applied to antilog circuit 83 which generates the sequence of signals (R-Y), (B-Y) and (G-Y) that are demultiplexed into latches 80, 81 and 82.

The magnitude, C, of the vector sum of I and Q in the FIG. 4 embodiment is generated according to the equation $$C = |I|/|\cos\theta| \tag{12}$$

To this end the angles $\theta$ from element 57 are applied as address codes to a ROM 59 which is programmed to produce the log $|\cos|$ of the angle $\theta$ signal codes applied to its address input. The log $|\cos\theta|$ codewords from ROM 59 are applied to one input port of a subtractor circuit 60 wherein they are subtracted from the log $|I|$ codewords from ROM 53 to produce a signal corresponding to log $|I|/|\cos\theta|$. This signal is applied to ADDER 70 and the ACC circuit including reference 61, comparator 62 and integrator 63. The ACC circuit generates a control signal which is proportional to the average difference between the magnitude of the chrominance signal and a predetermined value. The control signal is applied to an input port of the microprocessor 66 along with horizontal and vertical synchronizing signals and a chrominance saturation control signal. A ROM 67 supplies the coefficients $g_r$, $g_b$ and $g_g$ to the microporcessor 66 which periodically calculates the products $G_i = \text{Acc} \cdot \text{Sat} \cdot g_i$ equal to the products of the Acc control signal, the saturation control signal and the respective projection coefficient.

It is noted that the coefficients $G_i$ may also include a term to compensate for the different color phosphor efficiencies of the particular image display tube employed in the receiver. The microprocessor generates the logarithms of the composite gain factors $G_i$ and outputs them to a buffer 68. From buffer 68 the log ($G_i$) gain factors are multiplexed at a $3F_{SC}$ rate into ADDER 70 where they are added to the log $|I|/|\cos\theta|$ signal to produce signal samples corresponding to log ($G_i C$). These samples or codewords are applied to adder 79 where they are combined with the log ($\cos(\Delta\theta_i - \Phi)$) signals.

What is claimed is:

1. In a TV signal processing system including a source of a first pair of quadrature related color mixture signals associated with a first set of coordinate axes, means for generating a second set of color mixture signals associated with a second set of coordinate axes, comprising:

means responsive to said first pair of color mixture signals for determining the vector sum, C, thereof;

means responsive to said first pair of color mixture signals for determining the angle, $\theta$, between said vector sum and one axis of said first pair of axes;

a source of angle values $\Delta\theta_i$, i being an index, said angle values being respectively equal to the angular separation between said one of said first pair of axis and each of said second set of coordinate axes;

means responsive to said angular values for forming signal values equal to algebraic sums of said angle value $\Delta\theta_i$ and angles $\theta$ for each value of $\theta$ and $\Delta\theta_i$;

means for producing signal values corresponding to trigonometric ratios ($TR_i$) associated with said algebraic sums of said angles; and means responsive to said trigonometric ratio values $TR_i$ and the magnitude, C, for producing products of C times $TR_i$.

2. The apparatus set forth in claim 1 wherein the means for producing the products C times $TR_i$ sequentially produces the products for all indexed values (i) and further includes means to demultiplex said products to separate output connections wherein each of said separate output connections outputs products associated with only one of the respective indicies.

3. The apparatus set forth in claim 1 wherein the means for producing the trigonometric ratios is a ROM programmed to produce output values corresponding to the cosines of input signals applied thereto.

4. The apparatus set forth in claim 2 further including means for altering the angles $\theta$ to automatically adjust said vector sum for flesh colors, comprising:

means connected between said means for determining the angle $\theta$ and said means for forming said algebraic sums and responsive to the values $\theta$ for nonlinearly adjusting the values of $\theta$ in the range of angles where said vector sum represents flesh color so that the adjusted angle, $\theta'$, corresponds to said vector sum tending more nearly to represent normal fleshtones.

5. The apparatus set forth in claim 4 wherein the means for altering the angles $\theta$ for adjusting fleshtones includes a ROM having an address input port connected to receive the values of angle $\theta$ as address codes and programmed to produce at an output port thereof adjusted angles $\theta'$ for said vector sum representing colors in the range of fleshtones.

6. The apparatus set forth in claim 5 wherein said ROM is programmed to produce adjusted angles $\theta'$ according to the function $\theta' = \theta - K\sin(M\theta)$ for angles $\theta$ in said range, and K and M are predetermined constants.

7. The apparatus set forth in claim 1 further including:

a source of vector projection coefficients $g_i$, where i equals said indicies associated with said angular values;

means connected between said magnitude determining means and said means for producing the products C times said trigonometric ratios, and responsive to said coefficients $g_i$ for altering the magnitude C by factors equal to said coefficient values.

8. The apparatus set forth in claim 7 further including:

a source of gain control signals;

means responsive to said gain control signals for multiplying said coefficients $g_i$ by said gain control signals to produce modified coefficients $g_i'$ for altering the magnitude C.

9. The apparatus set forth in claim 4 further including static tint control means for adjusting the overall tint of the reproduced image, comprising:

a source of static tint control signals;

means connected between the means for determining the angle $\theta$ and the means for adjusting flesh colors and responsive to said static tint control signals for incrementing and decrementing the values of angle $\theta$ according to the values of said static tint control signals.

10. In a color TV receiver including a source of digital quadrature related color mixture signals I and Q, color signal processing circuitry comprising:

means responsive to said I and Q signals for generating a signal corresponding to instantaneous values of the magnitude, C, of the vector sum thereof;

means responsive to said I and Q signals for generating a signal corresponding to angles $\theta$ between said vector sum and a coordinate axis associated with the I signal;

means, including a ROM, responsive to the angle $\theta$ signal for adjusting angles $\theta$ occurring in a range of values wherein said vector sum represents color signals corresponding to a range of fleshtones, said ROM being programmed to produce at an output thereof adjusted angles for values of angle $\theta$ in said range applied as address codes to an address input port of said ROM;

a source of angle values $\Delta\theta_R$, $\Delta\theta_B$ and $\Delta\theta_G$;

means responsive to said angle values $\Delta\theta_R$, $\Delta\theta_B$ and $\Delta\theta_G$ and said means for adjusting angles $\theta$, for sequentially producing angle values $(\Delta\theta_R - \theta)$, $(\Delta\theta_B - \theta)$ and $(\Delta\theta_G - \theta)$;

means responsive to said angle values $(\Delta\theta_R - \theta)$, $(\Delta\theta_B - \theta)$ and $(\Delta\theta_G - \theta)$ for producing the cosine values thereof;

a source of coefficient values $g_R$, $g_B$ and $g_G$ for relating a transmitted chrominance signal developed from I and Q components to (R-Y), (B-Y) and (G-Y) color mixture signals;

means responsive to said coefficient values and said magnitude signal for sequentially generating signal values corresponding to the products $g_R$ times C, $g_B$ times C, and $g_G$ times C;

means responsive to the products generated by the lastmost described means and said cosine values for generating signal values corresponding to the products $g_R C \cos(\Delta\theta_R - \theta)$, $g_B C \cos(\Delta\theta_B - \theta)$ and $g_G C \cos(\Delta\theta_G - \theta)$, and wherein the products $g_R C \cos(\Delta\theta_R - \theta)$ correspond to (R-Y) color mixture signal, the products $g_B C \cos(\Delta\theta_B - \theta)$ correspond to (B-Y) color misture signal and the products $g_G C \cos(\Delta\theta_G - \theta)$ correspond to a (G-Y) color mixture signal.

11. The receiver set forth in claim 10 further comprising:

a source of gain control signals;

means for multiplying each of said coefficients by said gain control signals to produce modified coefficients $g_R'$, $g_B'$ and $g_C'$, which modified coefficients are applied to the means for sequentially generating the products $g_R$ times C, $g_B$ times C and $g_G$ times C.

12. In a color TV signal processing system including a source of quadrature related color mixture signals I and Q associated with coordinate axes $\bar{I}$ and $\bar{Q}$, a method for generating (R-Y), (B-Y) and (G-Y) color mixture signals associated with coordinate axes (R-Y) (B-Y) and (G-Y) respectively displaced from a reference axis by angles $\Delta\theta_R$, $\Delta\theta_B$, and $\Delta\theta_G$, said method comprising:

determining the magnitude, C, of the vector sum of the I and Q signals;

determining the angle $\theta$ between said vector sum and said reference axis;

generating respective algebraic sums of the angles $\theta$ and said angle values $\Delta\theta_R$, $\Delta\theta_B$ and $\Delta\theta_G$;

generating respective trigonometric ratios (for example cosines) associated with said algebraic sums, for projecting said vector sums onto said (R-Y), (B-Y) and (G-Y) axes;

multiplying the magnitude, C, by respective projection coefficients $g_R$, $g_B$ and $g_G$; and multiplying said respective trigonometric ratios associated with the angle indicies R, B, and G by the respective products of said coefficients times magnitude C associated with coefficient indicies R, B and G.

13. The method set forth in claim 12 further comprising:

multiplying said coefficients by a chrominance gain control signal prior to multiplying magnitude C by said coefficients.

14. The method set forth in claim 12 further comprising:

applying the angles $\theta$ to a ROM programmed to output angle values adjusted for fleshtone correction before summing with the angle values $\Delta\theta_R$, $\Delta\theta_B$ and $\Delta\theta_G$.

* * * * *

UNITED STATES PATENT AND TRADEMARK OFFICE
CERTIFICATE OF CORRECTION

PATENT NO. : 4,523,221

DATED : Jun. 11, 1985

INVENTOR(S) : D. Chin et al.

It is certified that error appears in the above-identified patent and that said Letters Patent is hereby corrected as shown below:

Column 4, line 2      "$\theta$" should be --$\Phi$--.

Column 5, line 2 should read as follows:
$$--(B-Y)_a = G_B C \cos(\Delta\theta_B - \Phi)--.$$

Column 6, line 60     "$(\Delta\theta_B - \theta)$" should be --$(\Delta\theta_B - \Phi)$--.

Column 10, line 11     "(R-Y)" should be --$(\overline{R-Y})$--;

Column 10, line 12     "(B-Y) and (G-Y)" should be --$(\overline{B-Y})$ and $(\overline{G-Y})$--;

Column 10, line 23     "(R-Y), (B-Y)" should be --$(\overline{R-Y})$, $(\overline{B-Y})$--; and Column 10, line 24     "(G-Y)" should be --$(\overline{G-Y})$--.

Signed and Sealed this

Nineteenth Day of November 1985

[SEAL]

Attest:

DONALD J. QUIGG

Attesting Officer     Commissioner of Patents and Trademarks